May 27, 1930.  E. D. NEWKIRK ET AL  1,760,078
PROCESS FOR THE LOW TEMPERATURE REDUCTION OF IRON ORES
Filed Oct. 3, 1927
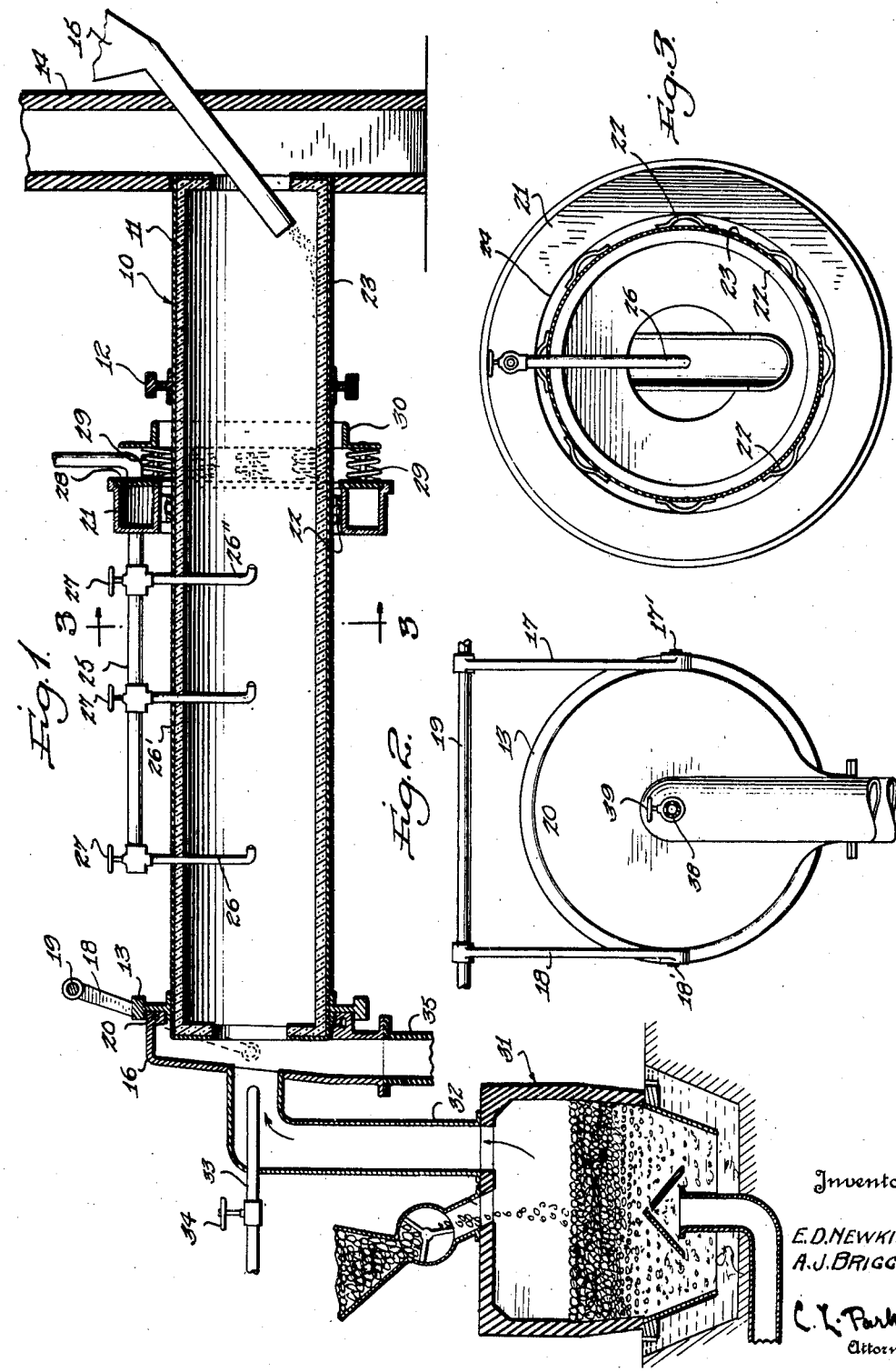
Inventor
E.D.NEWKIRK
A.J.BRIGGS
C. L. Parker
Attorney Patented May 27, 1930

1,760,078

UNITED STATES PATENT OFFICE

EDGAR D. NEWKIRK AND ARTHUR J. BRIGGS, OF SYRACUSE, NEW YORK

PROCESS FOR THE LOW-TEMPERATURE REDUCTION OF IRON ORES

Application filed October 3, 1927. Serial No. 223,794.

This invention relates to a process for the reduction of iron ore at relatively low temperatures.

An important object of the invention is to provide a process for the reduction of iron ores which is simple, efficient and inexpensive.

A further object of the invention is to provide a process of the character above described by which iron possessing certain superior qualities to that obtained by reduction in blast furnaces may be obtained from its ores.

A further object of the invention is to provide a process by which sponge iron of very high purity is produced from ores by subjecting the ores to relatively low temperatures.

A further object of the invention is to provide a process for the reduction of iron ore in which the ore, or ore and coke charge is subjected to reducing gases of progressively higher concentration as the charge travels from the entrance end to this discharge end of the furnace or kiln in which the ore is reduced.

A further object of the invention is to provide a process for the reduction of iron ores in which the reducing gases employed to accomplish the reduction of the ore, are progressively burned with air, as such reducing gases flow towards the end of the furnace or kiln at which the ore enters, thereby utilizing any surplus reducing gas which may not be used for reducing the ore in order to provide sufficient temperatures to carry out the reduction reactions.

The ease with which metallic iron can be reduced from its oxide by means of carbon, hydrogen and other reducing agencies at reasonably low temperatures has for years inspired investigation and research in the hope of finding a cheaper and more satisfactory method than now exists for the elementation of this valuable metal. Further, it seems evident that low temperature reduction retains certain desirable qualities in the iron that are not present in the iron as now reduced by the blast furnaces.

Of the many attempts to reduce iron at low temperatures, there are several that give promise but none has reached the economic position that is possible or necessary if this method is to supplant the present blast furnace or reach the position in the art that the improved quality of steel or iron, justifies.

A very pure iron is now being made in Sweden by placing alternate layers of the refined ore and charcoal in a vented sealed container and after heating to about 2000° F. until reaction ceases, it is then cooled without contact with air. When cold, the charcoal ashes are easily shaken from the fritted "cookies" of sponge iron. This gives an excellent product but its high cost makes its use very limited.

It has also been demonstrated in a semi-commercial way that when hot hydrogen, carbon monoxide or other reducing gases are passed over iron ore at in the general neighborhood of 1500° F., good grades of sponge iron are produced. This method also is too costly for economic commercial practice.

Of late, semi-successful commercial reduction of iron ore has been accomplished by heating an intimate mixture of finely ground ore and coal, the heat being in some cases supplied indirectly by transmission through refractory walls and in others by direct open firing in a rotary kiln.

In the two latter methods, a mixture of ground coal and ore is fed in the upper end of the kiln and the heat applied at the lower end. The volatiles of the coal are driven off and move out of the system before the charge comes to the temperature required for the deoxidation of the ore, and the reduced iron before being discharged from the kiln is subjected to the oxidizing influence of the heating flame.

As will later appear, all of these methods are commercially impractical because of their failure to supply the full chemical and metallurgical requirements of the reactions involved.

Within the last few years, it has come to be recognized that the solid phase reactions between carbon and iron ore occur but in a minor degree when reducing gases are present. For, if at atmospheric pressure both CO and C are present in the system, over 90% of the iron oxide will be reduced through the agency of the gas phase reaction of CO, and less than 10% of the iron oxide will be reduced by carbon in the solid phase.

The gas phase reducing reactions of a mixture of carbon and iron ore, when heated to proper temperature are shown by the following equations:

(1) $3Fe_2O_3 + CO \rightarrow 2Fe_3O_4 + CO_2, + 16,500$ Cal.

(2) $2Fe_3O_4 + 2CO \rightarrow 6FeO + 2CO_2, - 11,400$ Cal.

The sum of these two reactions may be considered as representing the first stage of the reduction and may be written:

(3) $3Fe_2O_3 + 3CO \rightarrow 6FeO + 3CO_2 + 5,100$ Cal.

To complete the reduction the following reaction takes place.

(4) $6FeO + 6CO \rightarrow 6Fe + 6CO_2 + 13,800$ Cal.

The $CO_2$ produced, coming in contact with the heated carbon reacts to form double its volume of CO.

(5) $9CO_2 + 9C \rightarrow 18CO - 351,000$ Cal.

Hydrogen reacts similarly, the sum of the reactions being:

(6) $3Fe_2O_3 + 9H_2 \rightarrow 6Fe + 9H_2O - 68,400$ Cal.

(7) $9H_2O + 9C \rightarrow 9H_2 + 9CO - 263,700$ Cal.

In considering the important bearing the reducing gases have in this system, it is apparent that we should first of all take into consideration the fundamental equilibrium data effecting the system involved.

A study of the equilibria of these reactions indicates the high concentrations of the reducing gases necessary. This can be shown by the following equations and the corresponding equilibrium constants.

(8) $H_2 + FeO \rightleftharpoons H_2O + Fe$ $$K = \frac{pH_2(FeO)}{pH_2O(Fe)} = .83 \text{ at } 1800° F.$$

(9) $CO + FeO \rightleftharpoons CO_2 + Fe$ $$K = \frac{pCO(FeO)}{pCO_2(Fe)} = 8.1 \text{ at } 1800° F.$$

In the equations, $p$ represents partial pressure and K represents the equilibrium constant of the reaction.

Thus it will be readily understood that in the reduction of FeO to Fe by CO, as shown in Equation 9, the partial pressure of CO in the reducing gas must be greater than .8 of an atmosphere when the sum of the $CO + CO_2$ partial pressures equals one atmosphere if the temperature of the ore reducing kiln be 1800° F., in order to have the reaction proceed as indicated by the upper arrow. If the partial pressure of CO in the reducing gas be less than .8 of an atmosphere, the reaction will proceed as indicated by the lower arrow, thus oxidizing Fe to FeO. From this it will be seen that in order to completely carry out the reduction of FeO to Fe by CO, the partial pressure of CO in the reducing gas must be greater than .8 of an atmosphere. Stated differently, the concentration of CO in the reducing gas, must be greater than 80 per cent.

These constants for the reduction of $Fe_3O_4$ to FeO are seen to be considerably smaller as indicated below.

(10) $H_2 + Fe_3O_4 \rightleftharpoons H_2O + 3FeO$ $$K = \frac{pH_2(Fe_3O_4)}{pH_2O(3FeO)} = .48 \text{ at } 1800° F.$$

(11) $CO + Fe_3O_4 \rightleftharpoons CO_2 + 3FeO$ $$K = \frac{pCO(Fe_3O_4)}{pCO_2(3FeO)} = 1.8 \text{ at } 1800° F.$$

These constants are given for the purpose of showing the relative concentration of reacting gases required in the two principal stages of the process.

In the $$\frac{CO \; Fe_2O_3}{CO_2 \; Fe}$$

reversible system, it appears that reduction takes place in three stages, each stage becoming substantially complete before the next stage is begun as indicated by Equations 1, 2 and 4; that a low concentration of the reducing gases in this system will complete the first stage (Equation 1); that a higher ratio of $CO/CO_2$ is required for the second stage (Equation 2), and that finally the last stage (Equation 4) requires at 1800° F. a partial pressure of the CO in the ratio of .8 atmospheres where the sum of the partial pressures of the CO and $CO_2$ equal 1 atmosphere. Under these conditions about 95% reduction of the ore to metallic iron may be expected. If a higher degree of deoxidation of the ore is required, correspondingly higher partial pressures of CO are required at the point where the highest degree of elementation of the iron takes place.

At 1650° F. the reduction of FeO apparently ceases when the ratio of $CO/CO_2$ falls below .72/.28. Below this ratio iron is reoxidized, notwithstanding the fact that there may be no free oxygen in the system.

Since the amount of CO, irrespective of its concentration, required to reduce a unit of iron from $Fe_2O_3$ to FeO is ½ the amount required to reduce a similar unit from FeO to Fe (Equations 3 and 4) it follows that at 1650° F. the ratio of the $CO/CO_2$ gases discharged from the system under ideal counter current movement of the factors, will be about .58/.42 provided the initial CO concentration is 1 atmosphere. This combustible gas which would normally be discharged from the system, we utilize by fractionally burning same with air in order to furnish the heat required in reducing the $CO_2$ (which has been formed in the process of reducing the ore) to CO (Equation 5) as the former gas reacts with the hot carbon present in the system.

Therefore, from the equilibrium requirements, it follows that economy in ore reduction indicates a counter current movement of the ore and reducing gases; that low concentration of reducing gases will start the reduction of the ore; that progressively higher $CO/CO_2$ ratios are required as the reduction of the ore proceeds, and that finally the highest concentrations of the reducing gases are necessary, at the point where final deoxidation takes place.

When ore is mixed with solid reducing agents such as carbon, coal or coke, these equilibria hold and the function of the solid reducing agent in any case, is that of reaction with the $CO_2$ substantially at the time it is formed to yield double volumes of CO (Equation 5) or to similarly react with water vapor to yield $H_2$ and CO (Equation 7).

The increase in volume of the CO and the reduction of available $O_2$ held in solid phase by the ore, favor the increase of reducing gas concentrations within the reaction bed, as the ore approaches deoxidation.

If the reaction mass is surrounded by an atmosphere of low CO concentration, the development of the required CO concentration within the reaction mass is hindered by reason of the diffusion of the CO to regions of lower CO concentration. The rate of diffusion being proportional to the relative difference in degree of concentration existing in the two parts of the system.

Since all stages of ore reduction by CO yield $CO_2$ which in turn is reduced by the carbon to CO absorbing heat in the process (Equation 5) it follows that heavy thermal absorption takes place where the reduction of the ore is most rapid. Under favorable temperature conditions, this would obviously be during the early stages of reduction where the oxygen held by the ore is in heavy concentration. It follows that to allow this CO to escape from the system without being reoxidized to $CO_2$, either by the iron oxide or in the production of useful heat applied where the system demands heavy thermal input, would result in low thermal and over all efficiency, as well as to limit the speed of the reducing reaction and the degree to which the iron oxide may be reduced. It is, therefore, apparent that in order to maintain reasonably uniform temperatures throughout the reaction zone, heat should be applied to the system at the places and in such amounts as the heat absorptions occur.

The present practice of burning fuel in contact with the reduced ore at the lower end of the kiln for the purpose of supplying heat to the reacting mass well within the interior of the kiln is bound to reoxidize the iron, for in studying the equilibrium constants of the reversible reactions

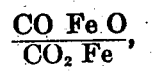

we find that a so called neutral flame at 1800° F. is decidedly oxidizing to iron. Attempts to make the heating flame reducing enough to prevent reoxidation of the reduced iron result in inadequate temperatures and poor economy.

Another disadvantage of this method of heating, as usually employed lies in the fact that when all the heating is done within a relatively short zone at the discharge end of the kiln, not only does local overheating occur, but the heat is applied at a point remote from the zone of heavy thermal requirements, and it becomes difficult to obtain even fairly good operating temperatures in the upper two-thirds of the reaction zone adjacent the region where reduction of the ore begins, without overheating the lower one third of the furnace adjacent its discharge end.

Reoxidizing the reduced material not only reduces the quality of the product but causes sintering or ringing up of accumulative adhesions to the walls of the kiln, making continuous operation difficult or impossible.

From the foregoing, it is apparent that the necessary conditions for speedy and economical reduction of iron from its oxides require—

1. An increasing concentration of reducing gases as the ore approaches complete deoxidation.

2. Provision for continously creating the necessary concentrations of the reducing gases.

3. Prevention in the fullest degree of the diffusion of the reducing gases away from contact with the iron oxide as the latter is being reduced.

4. The burning of the CO not used in the reduction of ore to furnish useful heat where heavy thermal input is required.

5. Ability to maintain and control temperatures throughout the reduction zone.

So far as we know, no existing methods provided for the fulfillment of all these requirements and to meet these conditions in a workable and practical manner is the aim and result of our invention.

In our invention, we use an internally fired rotary kiln disposed slightly from the horizontal so that the ore, or ore and coke, or ore and coal mixture entering one end, gradually moves throughout the length of the kiln and is discharged at the lower end. For purposes of economy, we prefer to use a charge of iron ore and powdered, low grade, very friable coke. Hot highly reducing gases enter at the low end and there come in contact with the iron in its reduced condition. Successively as the thermal requirements of the reaction, and radiation require, air is admitted at intervals but only in sufficient quantities to maintain the required temperature. This progressive fractional combustion of the heating gases by air leaves the concentration of the heating gases over the region of complete ore reduction practically undisturbed but gradually decreases the partial pressure of the reducing gases as they move counterwise to the movement of the ore. Moreover, by suitable adjustment of air, the required degree of temperature can be maintained over a long section of the kiln without danger of local overheating.

Another important feature of our process is that such CO as may be generated within the reaction bed and escapes therefrom, is added to the heating gases and there becomes oxidized by the incoming air. The heat thus liberated becomes available to satisfy the heat absorptions of the reducing reactions.

The advantage of this procedure becomes obvious from the study of the equilibria controlling this process. By this means, we maintain the atmosphere surrounding the reduced iron near the discharge end of the furnace or kiln in a highly reducing condition, retard the CO migration from within the reaction bed and effectively and completely eliminate any tendency toward sintering or reoxidation. Further advantages are—economy of fuel, easy temperature control, ability to deliver heat where, and as the endothermic requirements of the reducing reactions demand, complete reduction of the ore, no reoxidation of the ore after it has been reduced and provision for obtaining suitable temperatures throughout a long section of the kiln, thereby permitting more rapid ore movement therethrough.

In the drawings wherein we have shown a preferred form of apparatus for reducing iron ores in accordance with the method described above.

Figure 1 is a longitudinal section of the apparatus employed,

Figure 2 shows in elevation the discharge end of the kiln, and,

Figure 3 is a transverse sectional view taken on line 3—3 of Figure 1.

Referring to the drawings, numeral 10 designates a rotary furnace or kiln which is lined with refractory material such as fire-brick 11. The lining used in the rotary kiln 10 may be either acid, basic or neutral.

The rotary kiln 10 is disposed at a slight angle to the horizontal, preferably at about a 5° angle, with the end of the kiln at which the charge enters elevated above the discharge end of the kiln. The rotary kiln is mounted within tires 12 and 13 which rest upon a plurality of supporting wheels, (not shown) and is rotated by power from any source being applied to the supporting wheels. At the right hand end of the kiln as shown in Figure 1 is a stack 14 and also a hopper 15 through which the charge of iron ore or mixture of ore and coke, is introduced into the rotary kiln. At the opposite, or discharge end of the kiln is a nonrotative end member 16 which forms a gas tight connection by contacting with the face of the tire 13. This nonrotative end member is supported by means of depending arms or rods 17 and 18 from a support 19 which extends transversely of and above the kiln at a point which is spaced inwardly from its discharge end. The arms 17 and 18 are flexibly mounted at their upper ends on the support 19, and at their lower ends engage trunnions 17′ and 18′ respectively. By this means, the non-rotative end member 16 may move, in any direction except that of rotation as the rotating kiln expands or contracts, and at the same time maintain a gas tight connection between the non-rotatable end member and the rotating kiln. The end member 16 preferably is provided with a water jacketed annular rim 20 which may be supplied with water or other cooling fluid to prevent burning out the rim and also to maintain the heavy grease which is used between the rim 20 and the side of the tire 13 at proper temperature.

Mounted on the rotative kiln 10 is an annular wind box 21. This wind box is maintained in spaced relation to the kiln 10 by means of supports 22 inserted between the shell 23 of the kiln and the inner circumference 24 of the wind box 21. A supply pipe 25 leads from the wind box 21 and extends longitudinally of the kiln, and has a plurality of branch wind pipes 26, 26′ and 26″ attached at spaced intervals along pipe 25 as shown in Figure 1. Valves 27 are provided in the connection of the pipes 26, 26′ and 26″ with pipe 25 so that the amount of air which may be admitted through each of the pipes 26, 26′ and 26″, may be properly controlled. The ends of the pipes 26, 26′ and 26″ through which the air is delivered, preferably are bent so that they deliver the air toward the stack 14. The annular wind box 21 is provided with a nonrotative cover 28 which makes an air tight connection with the wind box. This stationary cover 28 is held in place by means of a series of springs 29 spaced circumferentially about the kiln, and having one of their ends contacting with the stationary wind box cover 28, and the other of their ends abutting against an annular stationary support 30 extending around the kiln 10.

A gas producer designated generally by the numeral 31 is provided at the discharge end of the kiln as shown in Figure 1. This producer may be of any usual or desired type and is not a part of this invention. The producer 31 is connected to the end member 16 by the pipe 32 and into the pipe 32 is placed air pipe 33 with control valve 34.

In the operation of the kiln shown in the drawings according to the process herein described, the kiln is first rotated and brought up to a suitable working temperature by admitting hot gas from the producer through the pipe 32 into the left hand end of the kiln as shown in Figure 1. Air is admitted as desired into the kiln through pipes 26, 26', 26'', and also through pipe 33 controlled by valve 34. When the kiln has been brought up to the desired temperature which is approximately 1800° F. a charge of iron ore or a mixture of ore and coke is introduced through hopper 15. The charge of ore or coke and ore flows toward the left end of the kiln as shown in Figure 1, and the reducing gases supplied by the gas producer flow in the opposite direction and exit through the stack 14. The charge is preheated as it travels from the entrance end down to a point slightly to the right of the air pipe 26''. As the charge travels to the left of the kiln as shown in Figure 1 it is constantly subjected to reducing gases of successively higher concentrations until it reaches the discharge end of the kiln and is discharged through outlet 35. From here the reduced iron may be conveyed away by any desired means and separated from the gangue, the freeing of the product from impurities forming no part of our invention. The product should be kept out of contact with air until it has cooled to prevent oxidation.

The iron so produced is in the form of granular or sponge iron. This sponge iron may be utilized in any desired manner for the production of steel, wrought iron, or other ferrous products. The sponge iron produced in accordance with the process herein described, possesses qualities not found in pig iron produced in blast furnaces.

Although we have described in detail the reduction of iron ore, we do not limit our invention thereto as our process is equally applicable to the reduction of ores bearing nickel, copper, and similar metals. If it is desired to produce metals from sulphid ores, it is only necessary to roast such ores in accordance with well known practices to oxidize the metals, and then proceed as described in the reduction of iron ores.

By the term "oxid ores" as used in the claims is meant ores which consist normally to a substantial extent of oxids or ores in which the compound or compounds of the metal to be extracted have been converted into an oxid or oxids.

While we have described in detail the preferred method of practicing our invention and have shown a preferred type of apparatus to be employed in our process, it is to be understood that various changes may be made in the details of procedure and in the arrangement of parts of the apparatus without departing from the spirit of our invention or the scope of the subjoined claims.

We claim:

1. The process of reducing oxid ores of metals comprising subjecting a charge of ore and carbonaceous material to progressively higher partial pressures of reducing gases at temperatures favorable to the reduction.

2. The process of reducing oxid ores of metals comprising subjecting a charge of ore and carbonaceous material to the action of hot reducing gases and progressively partially burning said reducing gases with air during the reduction of said ore.

3. The process of reducing oxid ores of metals comprising subjecting a charge of ore and carbonaceous material to the action of hot reducing gases flowing counter-current-wise to the direction of travel of the ore, and progressively increasing the partial pressure of the reducing gases as the reduction of the ore proceeds.

4. The process of reducing oxid ores of metals comprising subjecting a mixture of ore and carbonaceous material to hot reducing gases flowing counter-current-wise to the movement of the ore, and progressively and fractionally burning said reducing gases with air during the reduction of the ore, the extent of such burning of the reducing gases progressively increasing toward the source of the current of ore.

5. The process of reducing oxid ores of metals comprising subjecting a stream of ore and carbonaceous material in a kiln to a counter-current movement of hot reducing gases, controlling the temperature therein and throughout by progressively and fractionally burning the reducing gases with air, and preheating the incoming charge of ore by finally burning with air the reducing gases that escape from the ore reducing zone of the kiln.

6. The process of reducing oxid ores of metals comprising subjecting a moving charge of ore and carbonaceous material to a counter-current movement of hot reducing gases of progressively higher partial pressures, and controlling the temperatures throughout the reaction zone by progressively burning the reducing gases with air.

In testimony whereof we affix our signatures.

EDGAR D. NEWKIRK.
ARTHUR J. BRIGGS.